United States Patent
Gupta et al.

(10) Patent No.: US 11,281,502 B2
(45) Date of Patent: Mar. 22, 2022

(54) DISPATCHING TASKS ON PROCESSORS BASED ON MEMORY ACCESS EFFICIENCY

(71) Applicant: International Business Machines Corporation, Armonk, NY (US)

(72) Inventors: Lokesh M. Gupta, Tucson, AZ (US); Matthew J. Kalos, Tucson, AZ (US); Kevin J. Ash, Tucson, AZ (US); Trung N. Nguyen, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/798,339

(22) Filed: Feb. 22, 2020

(65) Prior Publication Data

US 2021/0263781 A1 Aug. 26, 2021

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC .............................. G06F 9/5083; G06F 9/4881
See application file for complete search history.

(56) References Cited

U.S. PATENT DOCUMENTS

| | | | |
|---|---|---|---|
| 6,314,493 B1 * | 11/2001 | Luick | G06F 9/3804 711/137 |
| 7,380,232 B1 * | 5/2008 | Schumacher | G06F 30/34 716/104 |
| 7,900,205 B2 | 3/2011 | Abe | |
| 8,489,857 B2 | 7/2013 | Hobson et al. | |
| 9,542,244 B2 | 1/2017 | McGarry et al. | |
| 9,720,739 B2 | 8/2017 | Ding | |
| 10,186,007 B2 | 1/2019 | Barik et al. | |
| 10,275,280 B2 | 4/2019 | Borlick et al. | |
| 10,628,280 B1 * | 4/2020 | Reeves | G06F 11/3476 |
| 10,929,181 B1 * | 2/2021 | Chandrasekaran | G06F 9/4881 |
| 2007/0121161 A1 * | 5/2007 | Yamada | G06F 3/122 358/1.16 |

(Continued)

OTHER PUBLICATIONS

Chen et al.; "Task Scheduling For Heterogeneous Multicore Systems", Cornell University Library, arXiv:1712.03209v1, pp. 1-14, Dec. 8, 2017.

(Continued)

*Primary Examiner* — Camquy Truong
(74) *Attorney, Agent, or Firm* — Nelson IP; Daniel P. Nelson (57) ABSTRACT

A method for dispatching tasks on processor cores based on memory access efficiency is disclosed. The method identifies a task and a memory area to be accessed by the task. The method may use one or more of a compiler, code knowledge, and run-time statistics to identify the memory area that is accessed by the task. The method identifies multiple processor cores that are candidates to execute the task and identifies a particular processor core from the multiple processor cores that provides most efficient access to the memory area. The method dispatches the task to execute on the particular processor core that is deemed most efficient. A corresponding system and computer program product are also disclosed.

20 Claims, 7 Drawing Sheets

(56) References Cited

U.S. PATENT DOCUMENTS

| | | | |
|---|---|---|---|
| 2010/0095012 A1* | 4/2010 | Zuckerman | H04L 67/1097 709/231 |
| 2011/0078700 A1 | 3/2011 | Blackburn et al. | |
| 2017/0351555 A1 | 12/2017 | Coffin | |
| 2018/0074857 A1 | 3/2018 | Chang et al. | |
| 2018/0173644 A1 | 6/2018 | Keoberl et al. | |
| 2018/0203724 A1 | 7/2018 | Driever | |
| 2018/0028501 A1 | 10/2018 | Dreyer et al. | |
| 2019/0324741 A1* | 10/2019 | Paskalev | G06F 9/5077 |

OTHER PUBLICATIONS

Cho et al.; "A High Performance Load Balance Strategy For Real-Time Multicore Systems", The Scientific World Journal, vol. 2014, Article ID 101529, pp. 1-14, Apr. 14, 2014.

Chander et al.; "Three tier Proximity Aware Cache Hierarchy For Multi-Core Processors", Anna University, Chennai, India, pp. 1-5, Published 2007.

Talal et al.; "Survey On Task Scheduling For Multi-Core Systems", International Journal Of Recent Research Aspects ISSN: 2349-7688, vol. 2, Issue 1, pp. 88-94, Mar. 2015.

* cited by examiner

DISPATCHING TASKS ON PROCESSORS BASED ON MEMORY ACCESS EFFICIENCY

BACKGROUND

Field of the Invention

This invention relates to apparatus and methods for dispatching tasks on processor cores providing efficient memory access.

Background of the Invention

In enterprise storage systems such as the IBM DS8000® enterprise storage system, multiple servers may be provided to ensure that data is always available to connected hosts. When one server fails, the other server may pick up the I/O load of the failed server to ensure that I/O is able to continue between host systems and backend storage volumes, which may be implemented on storage devices (e.g. hard disk drives, solid state drives, etc.) within the enterprise storage system. This process may be referred to as a "failover." To provide the above-described functionality, each server may contain a processor complex (also known as a "central electronics complex") that includes one or more central processing units (CPUs) and other hardware configured to execute tasks, such as process I/O requests received from host systems. During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs.

Each server or processor complex in an IBM DS8000® enterprise storage system may include several processor chips and each processor chip may contain several processor cores. Each processor chip and associated processor cores may have associated memory that can be accessed faster than the memory of other processor chips. In the current design of the IBM DS8000® enterprise storage system, tasks may be executed by any processor core within any chip, and memory may be accessed by any processor core of any chip, regardless of the relative location of the chip and memory. However, the time needed for one processor core to access certain memory may differ significantly from the time needed for another processor core to access the same memory.

SUMMARY

The invention has been developed in response to the present state of the art and, in particular, in response to the problems and needs in the art that have not yet been fully solved by currently available apparatus and methods. Accordingly, embodiments of the invention have been developed to dispatch tasks on processor cores based on memory access efficiency. The features and advantages of the invention will become more fully apparent from the following description and appended claims, or may be learned by practice of the invention as set forth hereinafter.

Consistent with the foregoing, a method for dispatching tasks on processor cores based on memory access efficiency is disclosed. The method identifies a task and a memory area to be accessed by the task. The method may use one or more of a compiler, code knowledge, and run-time statistics to identify the memory area that is accessed by the task. The method identifies multiple processor cores that are candidates to execute the task and identifies a particular processor core from the multiple processor cores that provides most efficient access to the memory area. The method dispatches the task to execute on the particular processor core that is deemed most efficient.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as an apparatus, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
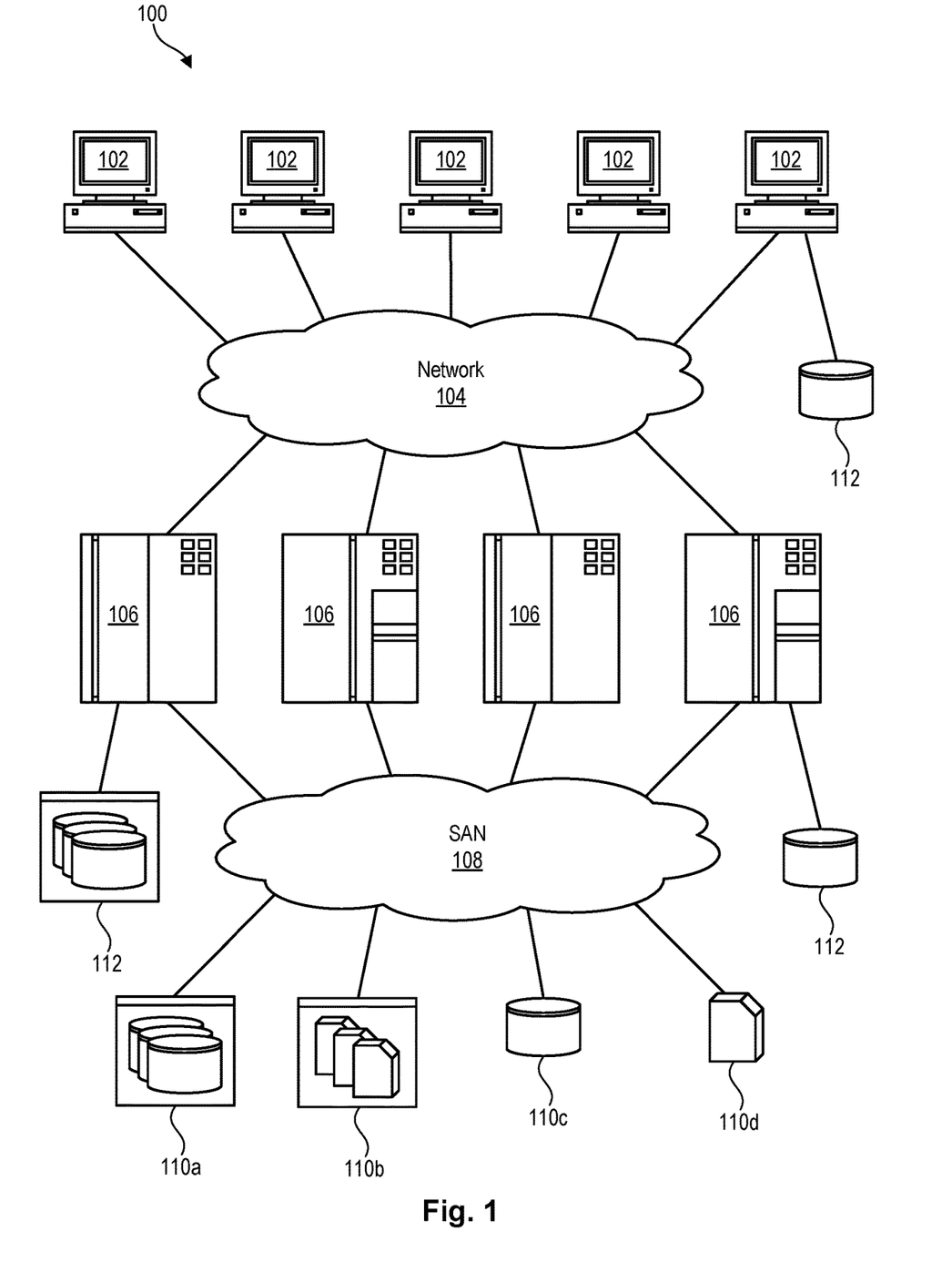
FIG. 1 is a high-level block diagram showing an exemplary network environment in which apparatus and methods in accordance with the invention may be implemented.

Referring to FIG. 1, one example of a network environment 100 is illustrated. The network environment 100 is presented to show one example of an environment where apparatus and methods in accordance with the invention may be implemented. The network environment 100 is presented by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
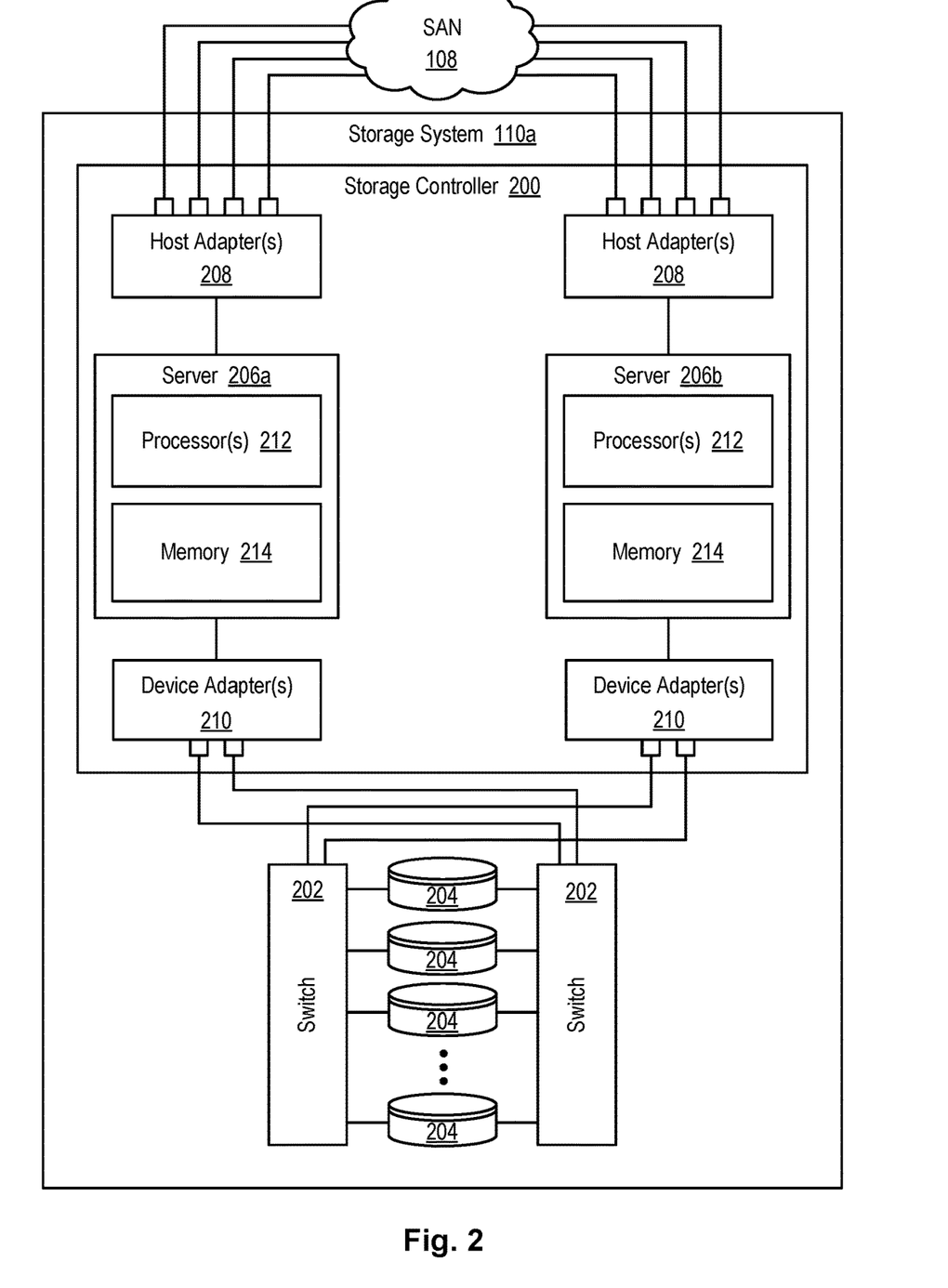
FIG. 2 is a high-level block diagram showing an exemplary storage system in which apparatus and methods in accordance with the invention may be implemented.

Referring to FIG. 2, one example of a storage system 110a containing an array of hard-disk drives 204 and/or solid-state drives 204 is illustrated. The internal components of the storage system 110a are shown since apparatus and methods in accordance with the invention may be implemented within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110a having an architecture similar to that illustrated in FIG. 2 is the IBM DS8000® enterprise storage system. The DS8000® is a high-performance, high-capacity storage controller providing disk and solid-state storage that is designed to support continuous operations. Nevertheless, the techniques disclosed herein are not limited to the IBM DS8000® enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000® is presented only by way of example and not limitation.

Figure 3:
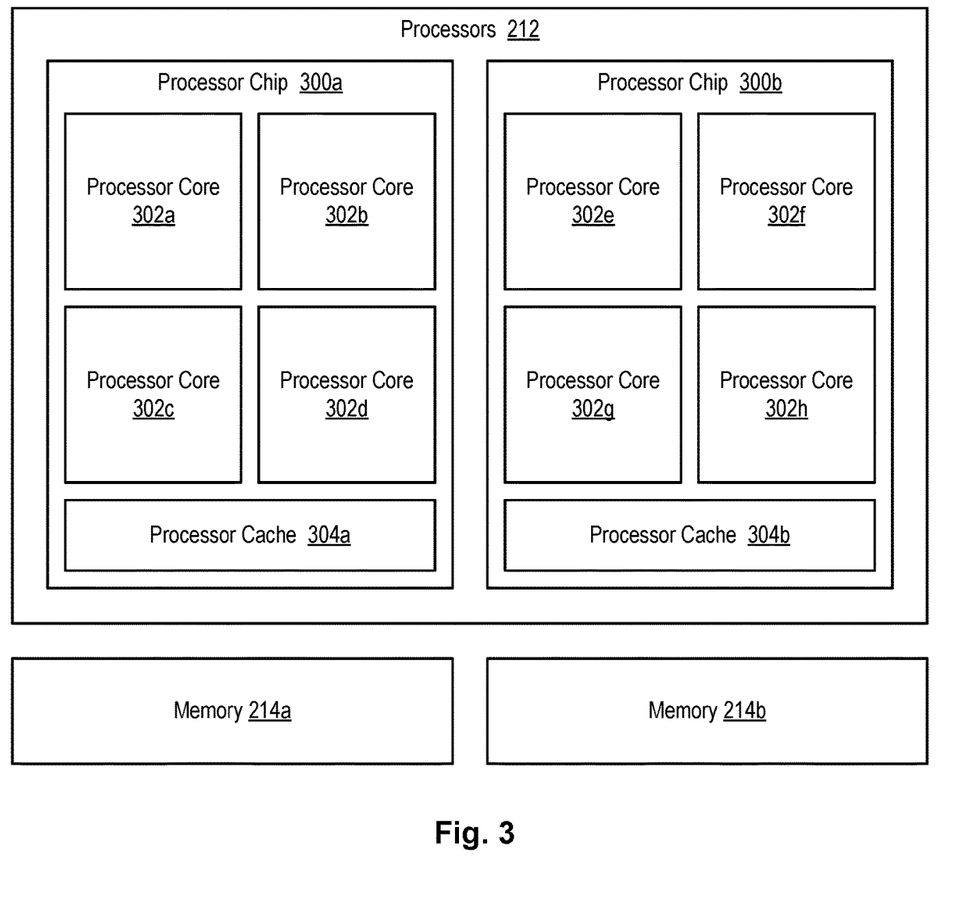
FIG. 3 is a high-level block diagram showing multiple processor chips, each having multiple processor cores, task wait queues, cache, and associated memory.

Referring to FIG. 3, as previously mentioned, each server 206 in an IBM DS8000® enterprise storage system may contain a processor complex (also known as a "central electronics complex") that includes one or more central processing units (CPUs) and other hardware configured to execute tasks, such as process I/O requests received from host systems 106. These processor complexes 212 may include multiple processor chips 300 and each processor chip 300 may contain several processor cores 302. Each processor chip 300 and associated processor cores 302 may have associated memory 214 that can be accessed faster than the memory 214 of other processor chips 300.

In the current design of the IBM DS8000® enterprise storage system, tasks may be executed by any processor core 302 within any processor chip 300, and memory 214 may be accessed by any processor core 302 of any processor chip 300, regardless of the relative location of the processor core 302 and the memory 214. However, the time needed for one processor core 302 to access certain memory 214 may differ significantly from the time needed for another processor core 302 to access the same memory 214. This may be the result of cache coherency operations and other overhead that needs to be performed when a processor core 302 accesses the memory 214 of another processor chip 300.

FIG. 3 shows an exemplary processor complex 212 that includes two processor chips 300a, 300b, with the first processor chip 300a containing four processor cores 302a-d, and the second processor chip 300b containing four processor cores 302e-h. In reality, a server 206 may include more processor chips 300 than what is illustrated and each processor chip 300 may include more or fewer processor cores 302 than what is illustrated. For example, a POWER8 processor used by an IBM DS 8000 enterprise storage system may have up to eight processor chips 300. Each chip 300 may contain up to six processor cores 302. Each processor core 302 may support several threads or tasks via simultaneous multi-threading (SMT). A POWER8 processor, for example, may operate up to eight threads or tasks per processor core 302.

As shown in FIG. 3, each processor chip 300 includes cache 304 for its respective processor cores 302. Each processor chip 300 also includes associated memory 214 (e.g., memory 214 that is closer to the processor chip 300). For example, the first processor chip 300a includes associated memory 214a. Similarly, the second processor chip 300b includes associated memory 214b. The processor cores 302 in each processor chip 300 may access their associated memory 214 faster than they can access the memory 214 of another processor chip 300. This is due to cache coherency operations (e.g., operations to ensure that cache 304 of the processor chips 300 contain valid data) and other overhead that may need to be performed when a processor core 302 accesses the memory 214 of another processor chip 300. These cache coherency operations are expensive and ideally avoided if possible. In certain embodiments, the architecture illustrated in FIG. 3 is based on non-uniform memory access (NUMA) as known to those of skill in the art.

Figure 4:
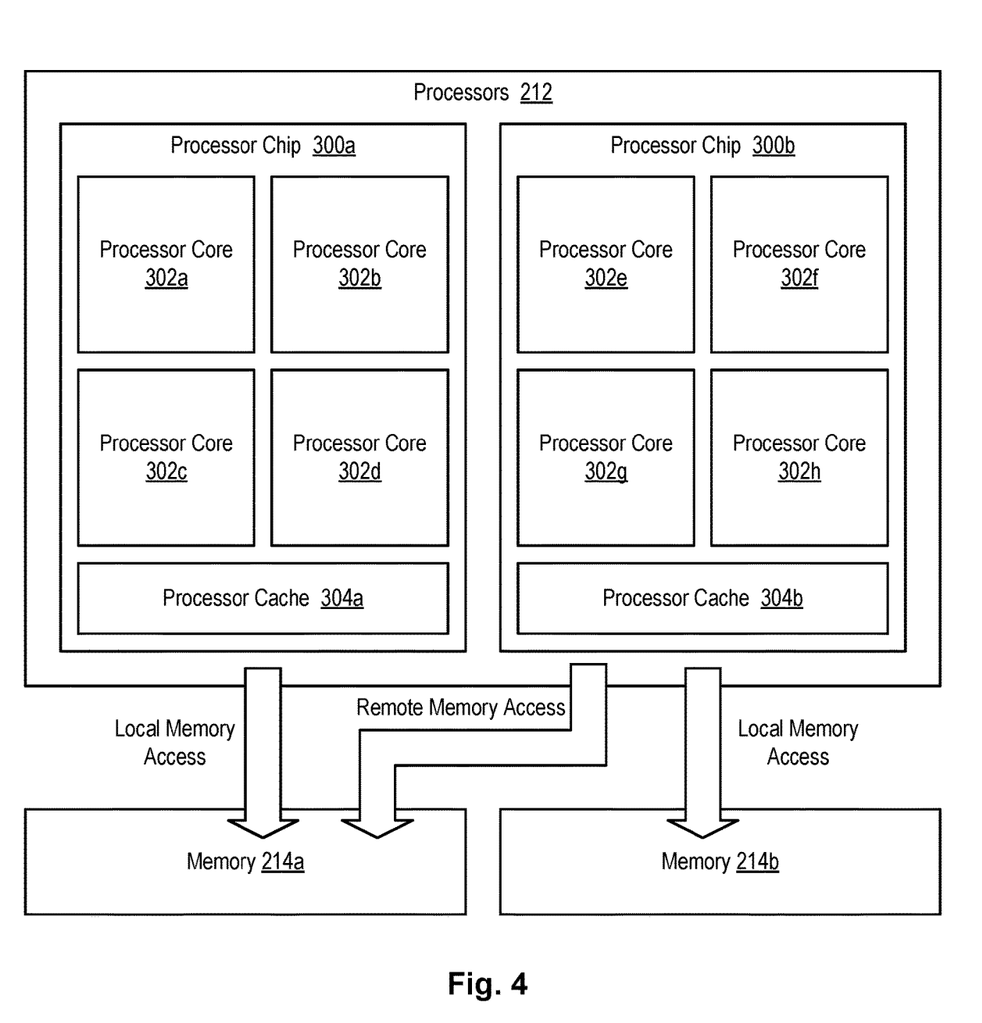
FIG. 4 is a high-level block diagram showing cores, within the processor chips, accessing local (i.e., associated) and remote (i.e., non-associated) memory.

As shown in FIG. 4, a memory 214a may be located closer to a processor chip 300a and thus provide faster and more efficient access to cores 302a-d on the processor chip 300a. By contrast, the memory 214a may be located further from the processor chip 300b and thus provide slower and less efficient access to cores 302e-h on the processor chip 300b. Thus, more optimal performance may be provided when a processor core 302 accesses its own associated memory 214.

Figure 5:
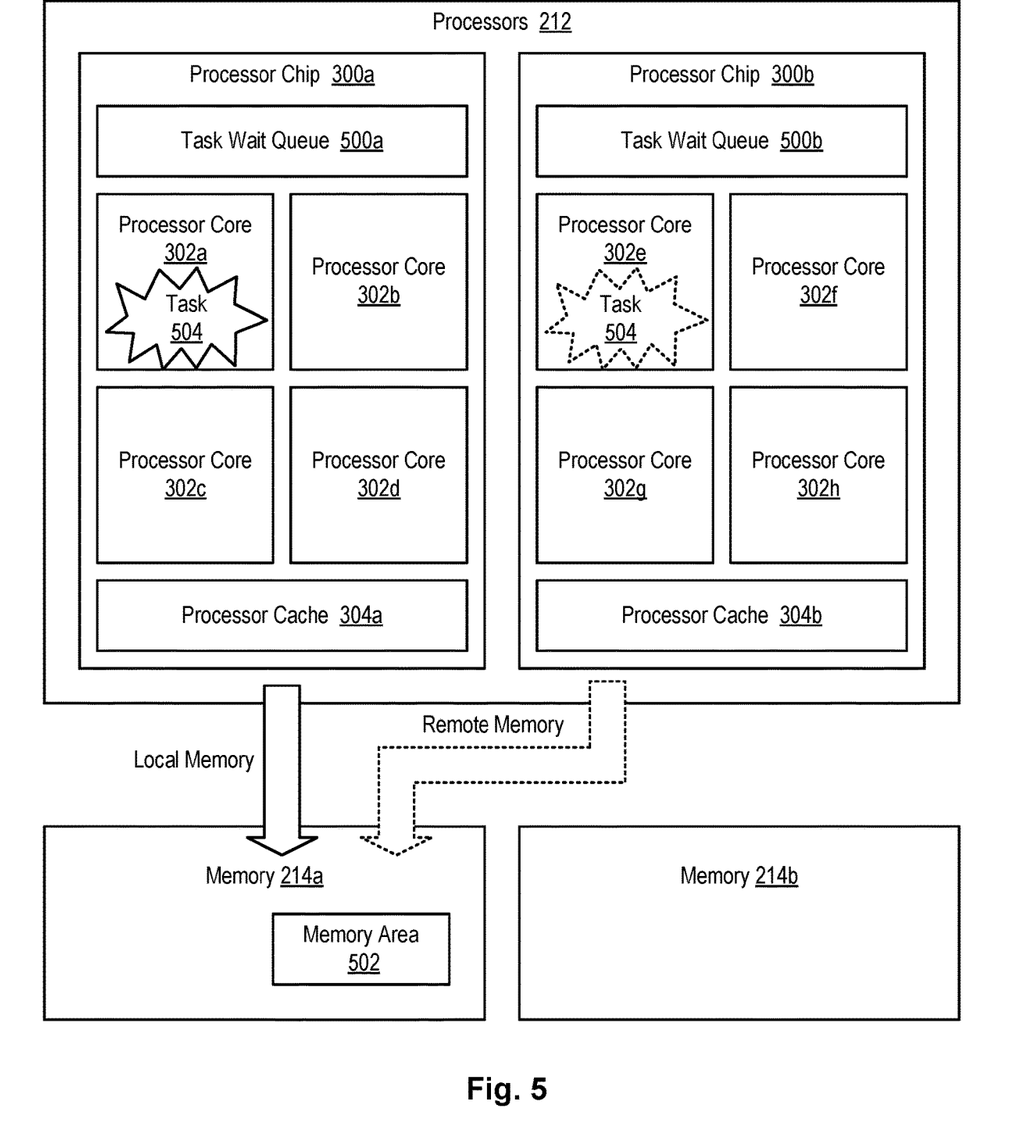
FIG. 5 is a high-level block diagram showing optimal execution of a task within the processor chips.

Referring to FIG. 5, in many cases, tasks 504 of the same type that execute on the processors 212 will access the same set of data residing in a memory area 502. If these tasks 504 can be executed on processor cores 302 that are closest to the memory 214 where the data is stored, the tasks 504 may be completed in a faster and more efficient manner. For example, a task 504 that accesses memory area 502 may be executed with greater efficiency on the processor core 302a than the processor core 302e since the memory area 502 is local to the processor core 302a whereas it is remote from the processor core 302e.

Nevertheless, the proximity of a memory area 502 to a processor core 302 is not the only factor when determining which processor core 302 is the most efficient to execute a task 504. As shown in FIG. 5, each processor chip 300 may include a task wait queue 500 that queues tasks waiting to execute on the processor chip 300. If a number of tasks waiting in the task wait queue 500 is large, a task 504 dispatched on the processor chip 300a may need to wait for a significant amount of time before it can execute. Thus, the length of a task wait queue 500 may significantly affect how efficiently a particular processor chip 300 can execute a task 504.

In certain cases, even though a first processor chip 300a may be closer to a memory area 502 that contains data that a task 504 needs to access, executing the task 504 on the first processor chip 300a may be less efficient than executing the task 504 on a second, more remote processor chip 300b. This may be true if the wait time in the task wait queue 500b of the second processor chip 300b is significantly less than the wait time in the task wait queue 500a of the first processor chip 300a. Thus, wait times in the task wait queues 500 are ideally balanced against the proximity of memory 214 when determining on which processor chip 300 a task 504 will most efficiently execute.

Figure 6:
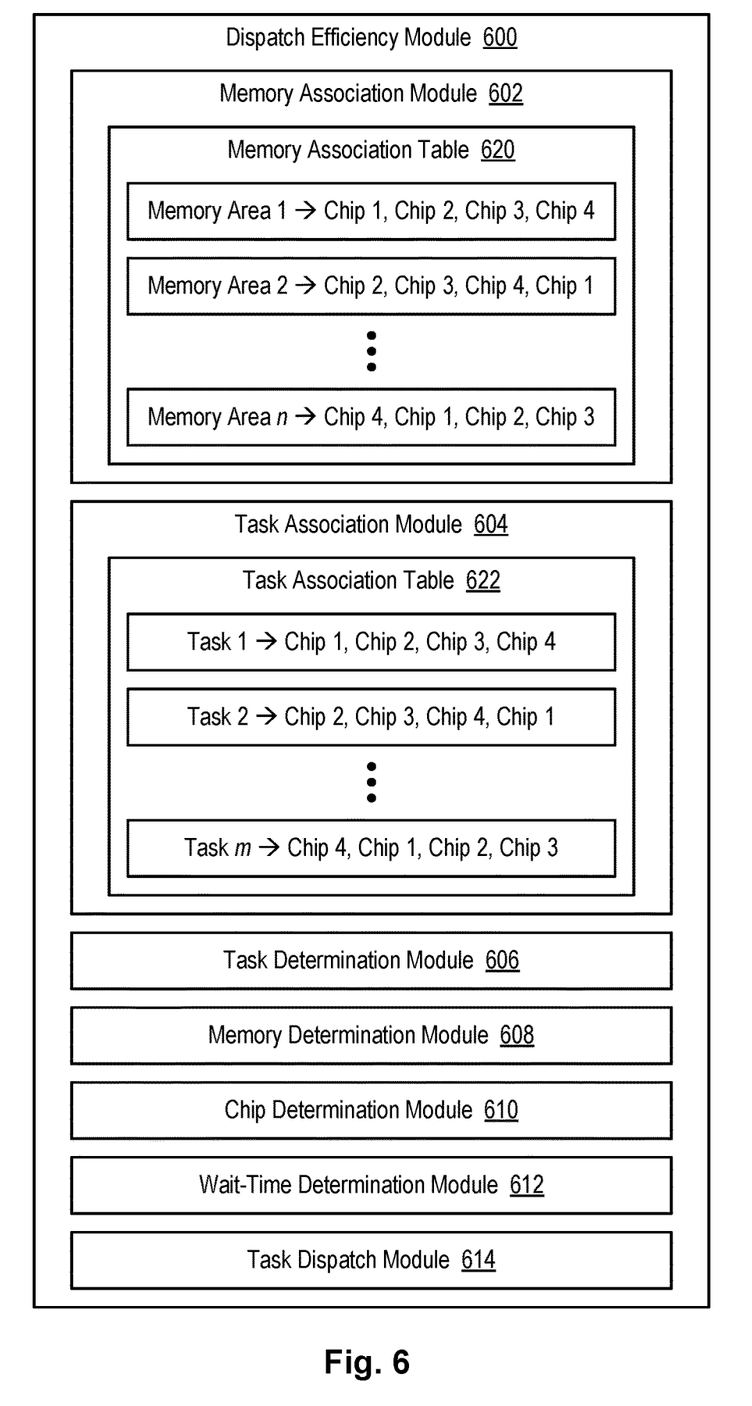
FIG. 6 is a high-level block diagram showing a dispatch efficiency module in accordance with the invention.

Referring to FIG. 6, in certain embodiments, a dispatch efficiency module 600 may be provided to dispatch a task 504 on a processor chip 300 that will execute the task 504 most efficiently. More specifically, the dispatch efficiency module 600 may balance wait times in the task wait queues 500 against the proximity of memory 214 when determining on which processor chip 300 to dispatch a task 504. In certain embodiments, the dispatch efficiency module 600 is implemented within the storage controller 200.

As shown in FIG. 6, the dispatch efficiency module 600 may include various sub-modules to perform various features and functions. These sub-modules may be implemented in hardware, software, firmware, or a combinations thereof. These sub-modules are presented by way of example and not limitation. More or fewer sub-modules may be provided in different embodiments. For example, the functionality of some sub-modules may be combined into a single or smaller number of modules, or the functionality of a single sub-module may be distributed across several sub-modules.

As shown, the dispatch efficiency module 600 includes one or more of a memory association module 602, task association module 604, task determination module 606, memory determination module 608, chip determination module 610, wait-time determination module 612, and task dispatch module 614.

The memory association module 602 is configured to associate memory areas 502 with particular processor chips 300 in order of proximity. In certain embodiments, the memory association module 602 may accomplish this by creating a memory association table 620. For example, as shown in FIG. 6, the memory association table 620 associates a "Memory Area 1" (which may be expressed as a memory address, a range of memory addresses, a collection of memory addresses, etc.) with "Chip 1, Chip 2, Chip 3, Chip 4" in order of proximity. In other words, "Memory Area 1" is closest to "Chip 1," second closest to "Chip 2", third closest to "Chip 3," and so forth. Similar associations may be made for other memory areas 502 (e.g., "Memory Area 2," etc.)

As mentioned above, each memory area 502 may be associated with a particular task 504. The memory area 502 accessed by a task 504 may be determined in various ways. For example, a compiler may be used to associate a task 504 with a memory area 502 since some compilers may include a compile-time option to determine memory that is accessed by a particular task 504. In other cases, code knowledge may be used to determine the association between a memory area 502 and a task 504. For example, in the IBM DS8000® enterprise storage system, there are certain tasks 504 that are known to access certain regions in memory 214. The LRU controller in the IBM DS8000® enterprise storage system, for example, accesses a cache directory control block (CDCB) or track control blocks that are allocated contiguously at a particular location in memory 214. In yet other cases, run-time statistics may be used to determine the association between a memory area 502 and a task 504. For example, counters may be created to record memory accesses by a task 504 in different regions in memory 214. After the task 504 has finished executing, a table may be created for the task 504 that indicates the memory regions that were accessed as well as a number of accesses for each of the regions.

Once the relationships between memory areas 502 and tasks 504 are known, the task association module 604 may associate the tasks 504 with particular processor chips 300. In certain embodiments, the task association module 604 may accomplish this by deriving a task association table 622 from the memory association table 620 described above. For example, as shown in FIG. 6, the task association table 622 associates "Task 1" with "Chip 1, Chip 2, Chip 3, Chip 4" in the order in which "Task 1" is preferably executed. In other words, "Task 1" is preferably executed on "Chip 1," then "Chip 2" as the next preferable option, then "Chip 3" as the next preferable option, and so forth.

At runtime, the task determination module 606 identifies a task 504 for execution and the memory determination module 608 determines a memory area 502 accessed by the task 504. The chip determination module 610 determines an ordered list of processor chips 300 based on their proximity to the memory area 502. The chip determination module 610 may make this determination using the memory association table 620 and/or task association table 622 previously described. The wait-time determination module 612, by contrast, determines task wait times on each of the processor chips 300 as well as an average wait time across the processor chips 300. The task dispatch module 614 balances the proximity of the processor chips 300 with the wait times on the processor chips 300 and dispatches the task 504 on the processor chip 300 that appears to provide the best efficiency.

Figure 7:
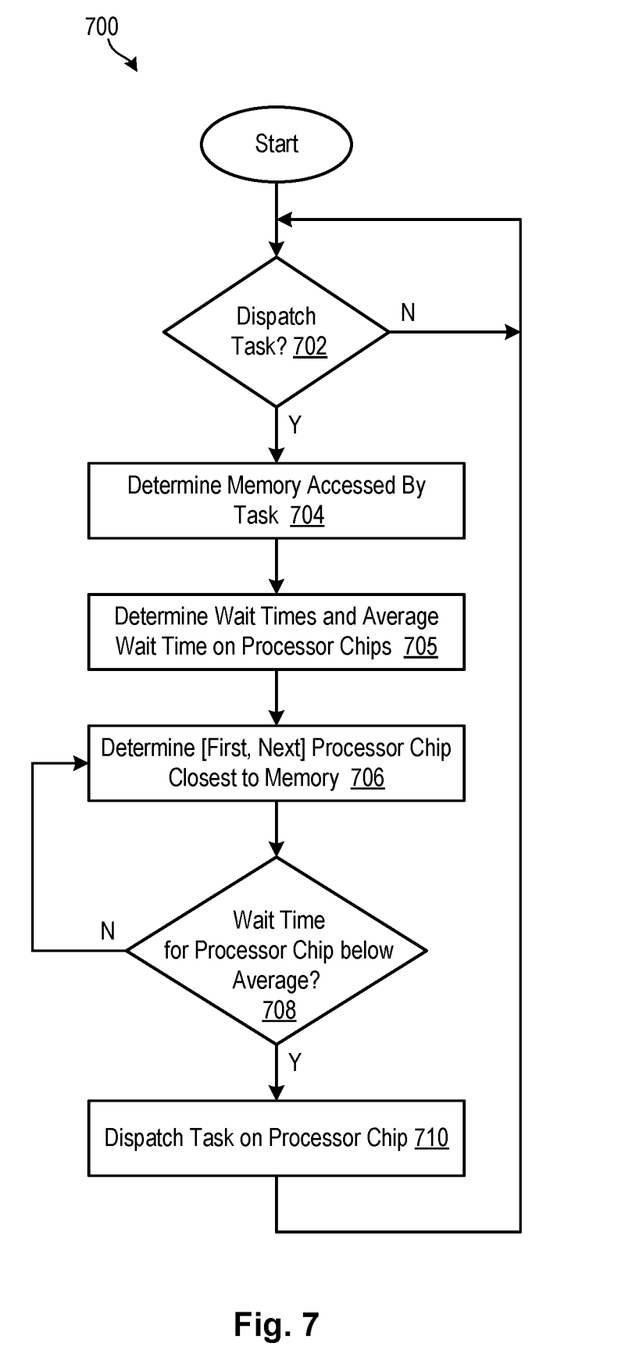
FIG. 7 is a flow diagram showing one embodiment of a method that may be executed by the dispatch efficiency module.

Referring to FIG. 7, one embodiment of a method 700 that may be executed by the dispatch efficiency module 600 is illustrated. This method 700 is provided by way of example and not limitation. As shown, the method 700 initially determines 702 whether a task 504 needs to be dispatched. If so, the method 700 determines 704 a memory area 502 that is accessed by the task 504. The method 700 also determines 705 task wait times for processor chips 300 that have access to the memory area 502 and the average wait time for the processor chips 300.

The method 700 then determines 706 a first processor chip 300 that is closest to the memory area 502 accessed by the task 504. This may be the first processor chip 300 listed for the task 504 in the task association table 622 previously discussed. If, at step 708, the wait time for the first processor chip 300 is below a threshold (e.g., an average wait time for all processor chips 300, or a certain percentage above an average), the method 700 dispatches the task 504 on the first processor chip 300. If, on the other hand, the wait time for the first processor chip 300 is not below the threshold, the method 700 determines the next closest processor chip 300 in the ordered list and determines 708 whether that processor core 302 has a wait time that is below the threshold. If so, the method 700 dispatches the task 504 on the next processor chip 300. This process is repeated until a processor chip 300 is found that is below the threshold.

If an average wait time is used for the threshold at step 708, the method 700 will eventually find a processor chip 300 in the ordered list whose wait time is below the average to execute the task 504. As stated above, in certain embodiments, a threshold such as a certain percentage (e.g., twenty percent) below the average may be used. That is, the method 700 may dispatch the task 504 on the first processor chip 300 that is found to have a wait time that is twenty percent or more below the average wait time for all processor chips 300.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dispatching tasks on processor cores based on memory access efficiency, the method comprising:
    identifying a task;
    identifying a memory area to be accessed by the task;
    identifying a plurality of processor cores that are candidates to execute the task and that are capable of accessing the memory area, wherein some processor cores of the plurality have different operational distances to the memory area;
    identifying a particular processor core from the plurality of processor cores that is operationally closest to the memory area while having a task wait time that is below a selected threshold; and
    dispatching the task to execute on the particular processor core.

2. The method of claim 1, wherein identifying the particular processor core comprises minimizing cache coherency operations required to access the memory area.

3. The method of claim 1, wherein the selected threshold is an average task wait time for all processor cores of the plurality.

4. The method of claim 1, wherein the selected threshold is a certain percentage above an average task wait time for all processor cores of the plurality.

5. The method of claim 1, further comprising using a compiler to identify the memory area to be accessed by the task.

6. The method of claim 1, further comprising using code knowledge to identify the memory area to be accessed by the task.

7. The method of claim 1, further comprising using run-time statistics to identify the memory area to be accessed by the task.

8. A computer program product for dispatching tasks on processor cores based on memory access efficiency, the computer program product comprising a computer-readable medium having computer-usable program code embodied therein, the computer-usable program code configured to perform the following:
    identify a task;
    identify a memory area to be accessed by the task;
    identify a plurality of processor cores that are candidates to execute the task and that are capable of accessing the memory area, wherein some processor cores of the plurality have different operational distances to the memory area;
    identify a particular processor core from the plurality of processor cores that is operationally closest to the memory area while having a task wait time that is below a selected threshold; and
    dispatch the task to execute on the particular processor core.

9. The computer program product of claim 8, wherein identifying the particular processor core comprises minimizing cache coherency operations required to access the memory area.

10. The computer program product of claim 8, wherein the selected threshold is an average task wait time for all processor cores of the plurality.

11. The computer program product of claim 8, wherein the selected threshold is a certain percentage above an average task wait time for all processor cores of the plurality.

12. The computer program product of claim 8, wherein the computer-usable program code is further configured to use a compiler to identify the memory area to be accessed by the task.

13. The computer program product of claim 8, wherein the computer-usable program code is further configured to use code knowledge to identify the memory area to be accessed by the task.

14. The computer program product of claim 8, wherein the computer-usable program code is further configured to use run-time statistics to identify the memory area to be accessed by the task.

15. A system for dispatching tasks on processor cores based on memory access efficiency, the system comprising:
    at least one processor; and
    at least one memory device operably coupled to the at least one processor and storing instructions for execution on the at least one processor, the instructions causing the at least one processor to:
    identify a task;
    identify a memory area to be accessed by the task;
    identify a plurality of processor cores that are candidates to execute the task and that are capable of accessing the memory area, wherein some processor cores of the plurality have different operational distances to the memory area;
    identify a particular processor core from the plurality of processor cores that is operationally closest to the memory area while having a task wait time that is below a selected threshold; and
    dispatch the task to execute on the particular processor core.

16. The system of claim 15, wherein identifying the particular processor core comprises minimizing cache coherency operations required to access the memory area.

17. The system of claim 15, wherein the selected threshold is an average task wait time for all processor cores of the plurality.

18. The system of claim 15, wherein the selected threshold is a certain percentage above an average task wait time for all processor cores of the plurality.

19. The system of claim 15, wherein the instructions further cause the at least one processor to use a compiler to identify the memory area to be accessed by the task.

20. The system of claim 15, wherein the instructions further cause the at least one processor to use run-time statistics to identify the memory area to be accessed by the task.

* * * * *